July 10, 1934.  C. W. HALL  1,965,642
SEALING MEANS FOR ROTARY VALVE ENGINES
Original Filed Oct. 16, 1931
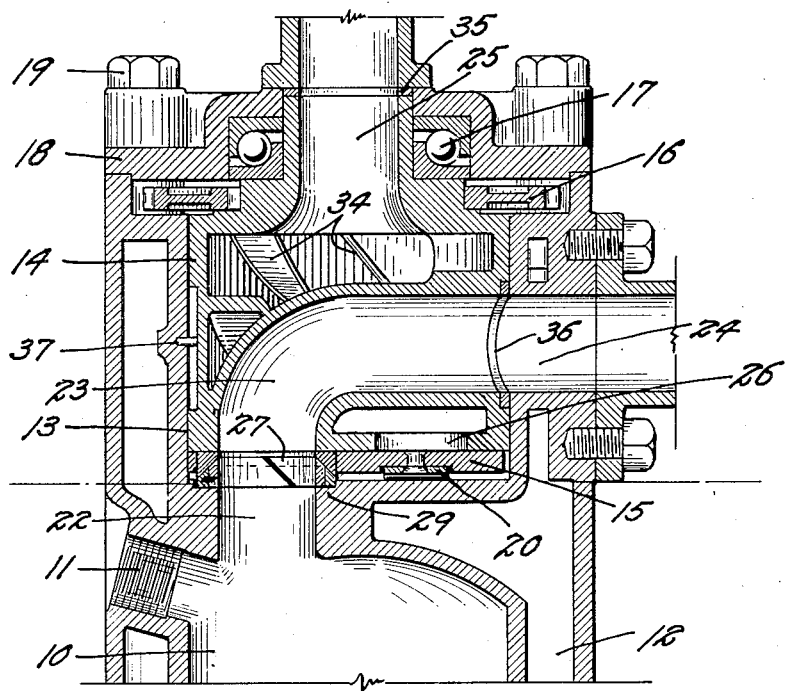
Fig. 1
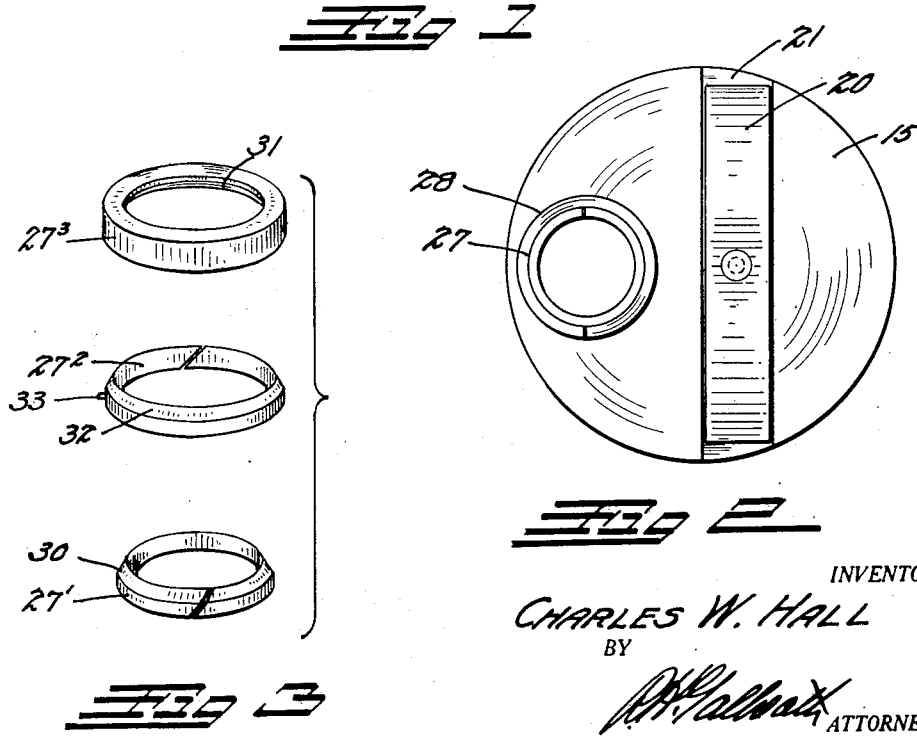
Fig. 2
Fig. 3
INVENTOR.
CHARLES W. HALL
BY
ATTORNEY.

Patented July 10, 1934

1,965,642

UNITED STATES PATENT OFFICE 1,965,642

SEALING MEANS FOR ROTARY VALVE ENGINES

Charles W. Hall, Denver, Colo., assignor to Hall Rotary Valve Motor Company, Denver, Colo., a corporation of Colorado Refiling of application Serial No. 569,229, October 16, 1931. This application March 19, 1934, Serial No. 716,399

2 Claims. (Cl. 123—190)

This invention relates to a rotary valve for internal combustion engines and has for its principal object the provision of efficient means for sealing the ports in the transverse face of a rotary valve from each other and from leakage around the cylinder port. One of the greatest difficulties encountered in the design of a rotary valve is to obtain an adequate seal at the point where the valve ports register with the cylinder ports. One method of accomplishing this seal is illustrated in applicant's prior Patents No. 1,792,689 and 1,797,062 and in application, Serial No. 569,229, filed Oct. 16, 1931, of which this is a re-filing. The present invention illustrates another development of my prior patents.

Another object of the invention is to provide a rotary valve with an axial passage in one of its faces and to employ this passage as a bearing support for aligning the valve and for absorbing the thrust thereof, which reduces the size of the bearing ordinarily required and provides a more compact and efficient construction.

Still another object of the invention is to provide a rotary valve with an exhaust passage which will enter a lateral face and exit through a cylindrical face so as to reduce the height or length usually required in a valve of this type.

A further object of the invention is to completely surround the above noted exhaust passage with an intake passage in which vanes are employed for maintaining constant circulation of cool intake gases about the hot discharge passage.

A still further object of the invention is to incorporate fan or blower vanes in an intake valve in such a way that they will act as a supercharger to assist in passing the intake gases to the cylinder.

And a still further object of the invention resides in the radially and axially expansible packing ring employed between the rotary valve and the cylinder and in the fact that this ring is entirely independent of the pressure plate employed for forcing the valve against its thrust bearing so that it may rotate on its seat.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical cross section through the improved rotary valve applied to the head of an internal combustion engine cylinder.

Fig. 2 is a detail bottom view of the pressure plate employed with the valve.

Fig. 3 illustrates the three component parts of the sealing ring.

The invention comprises an internal combustion engine cylinder 10 provided with the usual spark plug opening 11 and water jacket 12. The casting forming the cylinder 10 is extended upwardly above the cylinder so as to form a cylindrical water jacketed valve pocket 13 therein. The rotary valve, indicated in its entirety by the numeral 14, sets within the pocket 13 against a pressure plate 15 placed in the end of the pocket 13. The upper portion of the valve 14 is reduced to receive a suitable driving gear 16 and is still further reduced to receive a suitable ball thrust bearing 17. The entire valve is maintained in place by means of a suitable cylinder head 18, which acts as the co-acting part of the bearing 17 and is held in place by means of suitable studs 19.

The pressure plate 15 acts to constantly urge the valve 14 against its thrust bearing 17. This forcing action is accomplished by means of a leaf spring 20 which is secured in a cross channel 21 in the plate 15. The extremities of the spring 20 bear against the end of the pocket 13 so as to cause the plate to constantly force the valve against its thrust bearing.

A cylinder port 22 opens from the cylinder 10 through the end of the valve pocket 13 to one side of the axis thereof. An exhaust passage 23 is formed in the valve 14, one extremity of which registers at predetermined times with the cylinder port 22. The other extremity registering at these times with an exhaust port 24 in the cylinder head.

An intake passage 25 communicates axially through the reduced bearing extremity of the valve 14 with the hollow interior of the valve. An intake port 26 communicates between this hollow interior and the cylinder port 22 at predetermined times. The pressure plate 15 also acts as a sealing plate to close the exhaust passage 23 and the intake port 26 when they are not in communication with the cylinder port 22.

The valve ports are sealed from each other and from leakage at their point of registry with the cylinder port 22 by means of an axially and radially expansible sealing ring which is designated in its entirety on the drawing by the numeral 27. The sealing ring 27 passes freely through a ring aperture 28 formed in the pressure plate 15. The sealing ring 27 is relatively wider than the pressure plate 15 so that it may pass into a counter-bore 29 in the end of the valve pocket 13 about the cylinder 22. This projecting of the ring into the counterbore serves to prevent the bearing plate 15 from rotating with the valve 14.

It has been found that by having the sealing ring 27 entirely independent of the bearing plate 15 a much more effective seal is obtained since the sealing ring is not subjected to the vibrations or movements caused by facial pressures on the bearing plate. Another advantage obtained by this construction resides in the fact that the difference in peripheral speeds at the frictional points between the ring and the valve causes the ring to slowly and continually rotate in the ring aperture 28 and in the counterbore 29 so that it constantly grinds and polishes its seating surface to a perfect seat and wears uniformly at all points of its contact surfaces.

The sealing ring 27 may have any desired construction. It is preferred, however, to form it of a plurality of rings or parts in such a way that it will have axial expansion so as to constantly maintain itself tight between the valve and the counterbore. One method of accomplishing this is to form the ring of three parts as illustrated in Fig. 3, at $27^1$, $27^2$, and $27^3$. The part $27^1$ is a split ring formed with a beveled surface 30. The part $27^2$ is also a split ring formed with a beveled seating surface 32. The part $27^2$ is placed about the part $27^1$ and is held from rotation thereon by means of a suitable pin 33. When the two parts $27^1$ and $27^2$ are placed in the part $27^3$ the two beveled surfaces 30 and 32 rest against a beveled seat 31 formed on the part $27^3$. With this construction the natural tendency of the part $27^1$ to expand causes it, and the part $27^2$ to press outwardly against the inclined surface 31. This causes the entire ring assembly to expand axially. The part $27^3$ provides the bearing surface against the rotary valve.

This axial expansion is further assisted by the gas pressures on the inner face of the part $27^1$. These pressures serve to increase the radial expansion of the part $27^1$ and naturally increase, through the beveled surfaces, the axial expansion. With this construction the greater the pressure to which the sealing ring is subjected the greater will be its sealing ability.

The inner walls of the valve 14 are provided with spirally positioned vanes 34 which act as fan blades to assist in drawing the intake gas into the valve and discharging them into the cylinder. They further act as agitators to mix and agitate the intake gas so as to produce a perfectly combustible mixture, which when heated by the exhaust passage 23 is in perfect condition for introduction into the engine cylinder.

The point of exit of the intake passage 25 is provided with a suitable packing ring 35. The point of exit of the exhaust passage 23 is protected by a suitable split packing sleeve 36 which entirely surrounds the valve 14 in a suitable ring groove turned therein and is provided with an aperture for the exhaust gases. The packing sleeve 36 is prevented from rotation with the valve by means of a locking pin 37 which passes into its split.

The rotary valve illustrated is of the vertical type. The invention will apply equally well to a valve with its axis placed horizontally.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A rotary valve for internal combustion engines comprising: a rotatable valve member; a packing face formed on one face of said valve member at right angles to its axis and provided with offset intake and exhaust ports; an axial extension of reduced diameter extending from the other face of said valve and provided with a passage connecting with the intake port of the packing surface; bearing means mounted about said extension; an exhaust passage formed in said valve and communicating from said exhaust port to a port in the cylindrical side of said valve.

2. A rotary valve for internal combustion engines comprising: a rotatable valve member; a packing face formed on one face of said valve member at right angles to its axis and provided with offset intake and exhaust ports; an axial extension of reduced diameter extending from the other face of said valve and provided with a passage connecting with the intake port of the packing surface; bearing means mounted about said extension; an exhaust passage formed in said valve and communicating from said exhaust port to a port in the cylindrical side of said valve; and a packing sleeve surrounding said valve and provided with an aperture in alignment with said exhaust passage.

CHARLES W. HALL.